United States Patent [19]

Wolwowicz

[11] 4,266,691

[45] May 12, 1981

[54] CONTINUOUS AUTOMATIC FEEDING APPARATUS

[75] Inventor: Casimir S. Wolwowicz, Randolph, N.J.

[73] Assignee: Gero Industries, Inc., Hillside, N.J.

[21] Appl. No.: 923,533

[22] Filed: Jul. 11, 1978

[51] Int. Cl.² .............................................. G01G 13/00
[52] U.S. Cl. ....................................... 222/77; 222/56; 222/199; 177/121; 141/83; 141/128; 141/248
[58] Field of Search ..................................... 222/55–58, 222/77, 196, 198, 199, 234, 245, 526, 559; 141/83, 99, 128, 248; 177/98, 99, 114, 116, 119, 121, DIG. 11; 214/16 R

[56] References Cited

U.S. PATENT DOCUMENTS

| | | | |
|---|---|---|---|
| 2,921,713 | 1/1960 | Zanotto et al. | 222/56 |
| 3,098,537 | 7/1963 | Petrea | 177/98 |

Primary Examiner—H. Grant Skaggs

Attorney, Agent, or Firm—Hopgood, Calimafde, Kalil, Blaustein & Lieberman

[57] ABSTRACT

Continuous automatic feeding apparatus for bulk material is provided. The device has a vibratory feeder for moving the material to be fed, the feeder having a centrally disposed narrow spoon extending therefrom which provides a relatively small rate of material feed. A pair of hoppers are located under the composite feeder, and the material supplied to each controlled by a pair of displaceable deflectors. Each deflector has three positions: a first position in which the deflector prevents any flow into its associated hopper and deflects the flow into the other hopper; a second position in which the flow from the feeder is deflected to the other hopper but the flow from the spoon is permitted to enter its associated hopper; and a third position in which the flow from both the vibratory feeder and the spoon enters the associated hopper. Each hopper has a weigh cell and control apparatus associated therewith to operate the deflectors and empty the hoppers when a predetermined weight has been attained.

9 Claims, 1 Drawing Figure

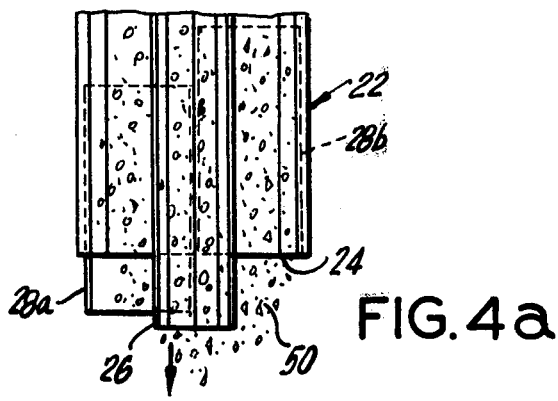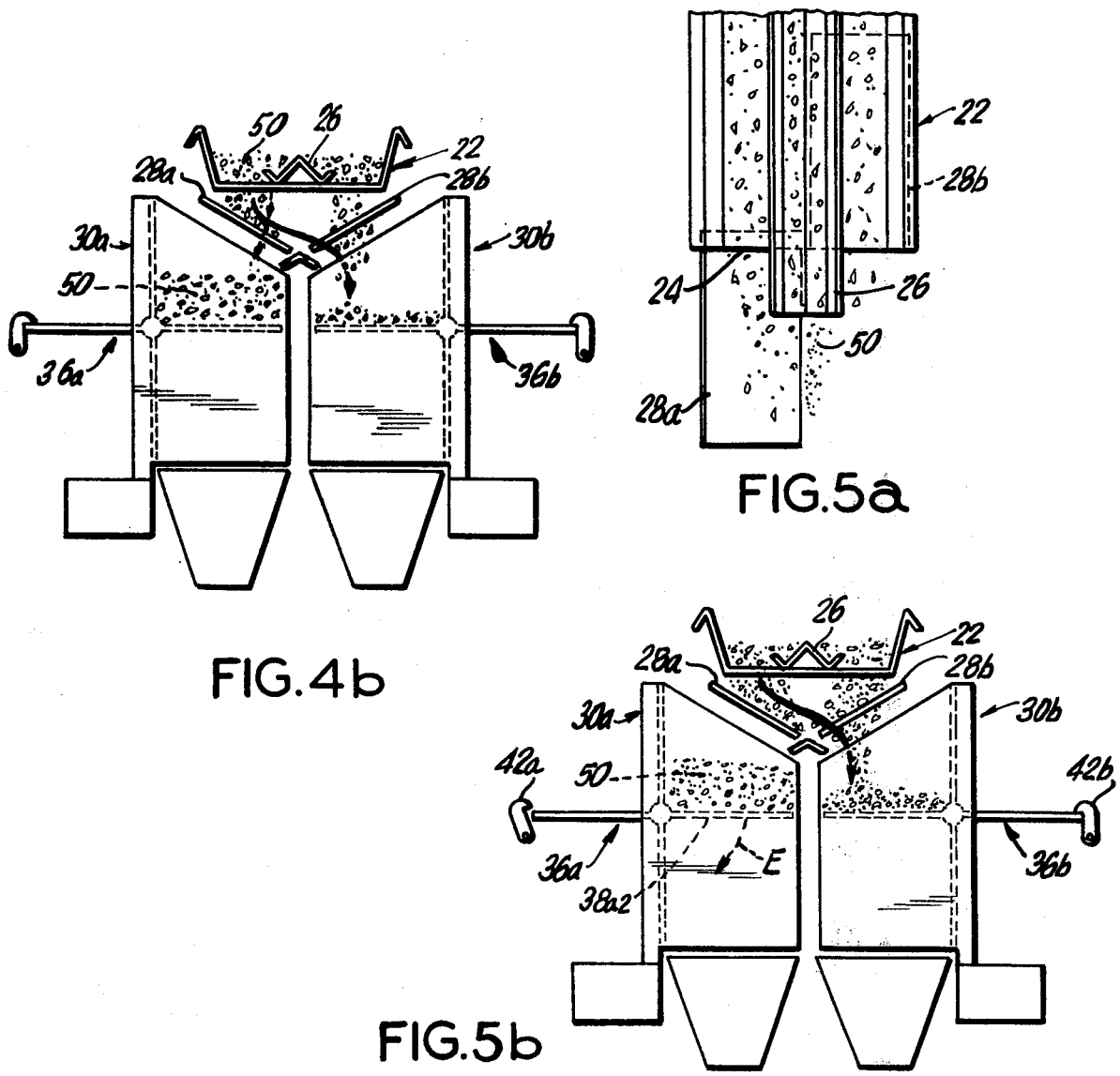

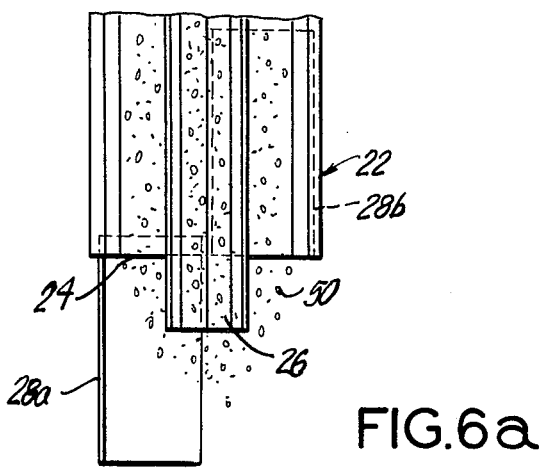
FIG.6a
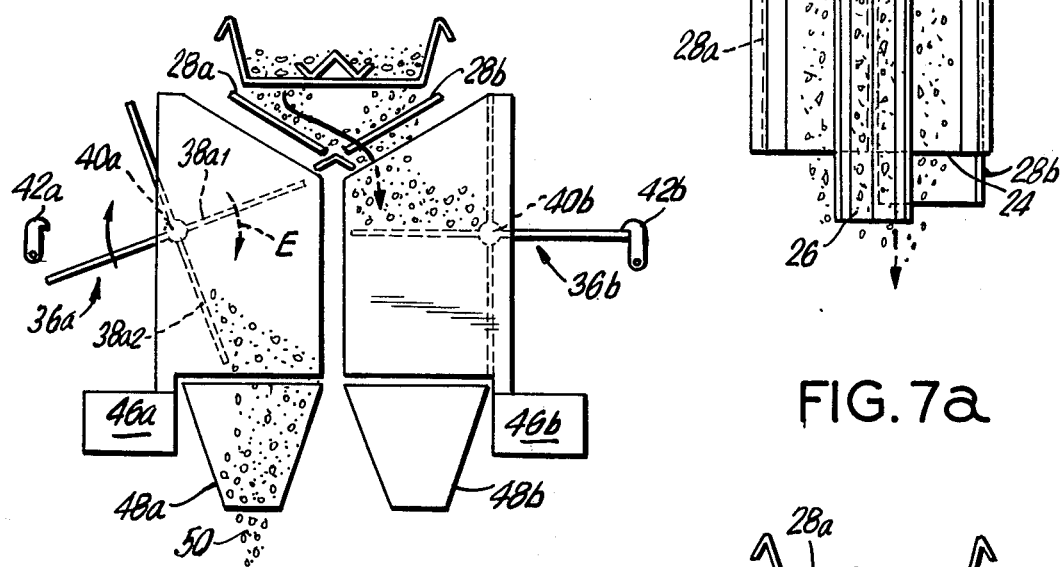
FIG.6b
FIG.7a
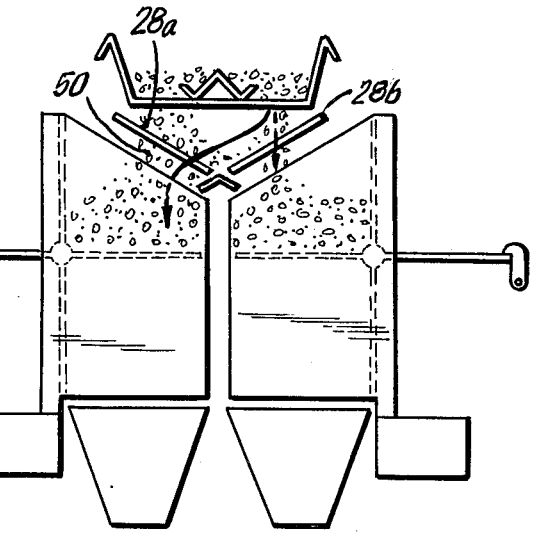
FIG.7b

CONTINUOUS AUTOMATIC FEEDING APPARATUS

BACKGROUND AND SUMMARY OF THE INVENTION

This invention relates generally to an automatic feeding device for loading bulk material into packaging.

While a variety of bulk material feeding structures are known in the art, many such devices require that feeding be stopped after a predetermined weight has been reached so that the material-receiving packaging may be replaced. When such a stoppage occurs, time is lost and with many bulk materials a clumping together of the material results. This clumping leads to improperly packaged material, as by the inability to obtain firm weight accuracy and discrimination in the packaging. In order to permit a continuous flow of material, a number of devices have diverted the material fed to a catch hopper during the change in packaging. This diversion also may result in clumping, and its associated problems. Futhermore, a mechanism is then required to recycle the diverted material into the main flow.

In any such weighing and feeding system there is a direct relationship between speed and accuracy. For any given system, the slower the cycle time, the greater the accuracy and vice versa. Accordingly, I have found it desirable to have a system having more than one rate of feed, a faster rate at the beginning of the feeding procedure and a slower rate near the end, so that accurate weight monitoring can occur. The instant invention provides such a dual rate system.

Generally speaking in accordance with the invention, a continuous automatic feeding system is provided. Bulk material is continually fed without stoppage into a pair of alternately filled hoppers. The device has a vibratory feeder for moving the bulk material, and which has a narrow forwardly extending spoon for feeding the material at a relatively low rate. Mounted above each hopper is a deflector having first, second and third positions. In the first, fully projecting position of the deflector, no material may enter the associated hopper and all material will be diverted into the other hopper. In the second position (employed when filling is nearly completed), only the material flowing from the spoon will enter the associated hopper with the bulk of the material being deflected to the other hopper. In the third position, material flowing from both the spoon and the feeder is permitted to enter the associated hopper. Each hopper has an associated weigh cell which will control the operation of the deflectors and automatically discharge the fed material when the predetermined weight has been attained.

Accordingly, it is an object of this invention to provide improved automatic weighing and feeding apparatus.

Another object of this invention is to provide an improved automatic weighing and feeding device providing for continuous flow of bulk material.

Another object of this invention to provide an improved automatic feeding device that prevents clumping of the fed material.

Another object of this invention is to provide an improved automatic feeding device that permits a high feeding rate combined with highly accurate package weight content.

Another object of this invention is to provide improved automatic feeding apparatus that does not require interrupting the flow of material during a change of packaging.

Still other objects of this invention will become apparent upon a reading of the detailed specification to follow.

BRIEF DESCRIPTION OF THE DRAWING

For a better understanding of the invention, reference is made to the following drawing, taken in connection with the detailed specification to follow:

FIGS. 4a and 4b illustrate the device of the invention toward the end of the feeding cycle of the first hopper, utilizing the slower rate of material flow into the first hopper from a central spoon;

FIGS. 5a and 5b illustrate the apparatus when the target weight of the first hopper has been reached;

FIGS. 6a and 6b illustrate the discharge cycle of the first hopper and the beginning of feeding of the second (right) hopper;

FIGS. 7a and 7b illustrate the end portion of the feeding cycle of the second hopper with the hopper being filled at the slower feeding rate;

DESCRIPTION OF THE PREFERRED EMBODIMENT

Figure 1A:
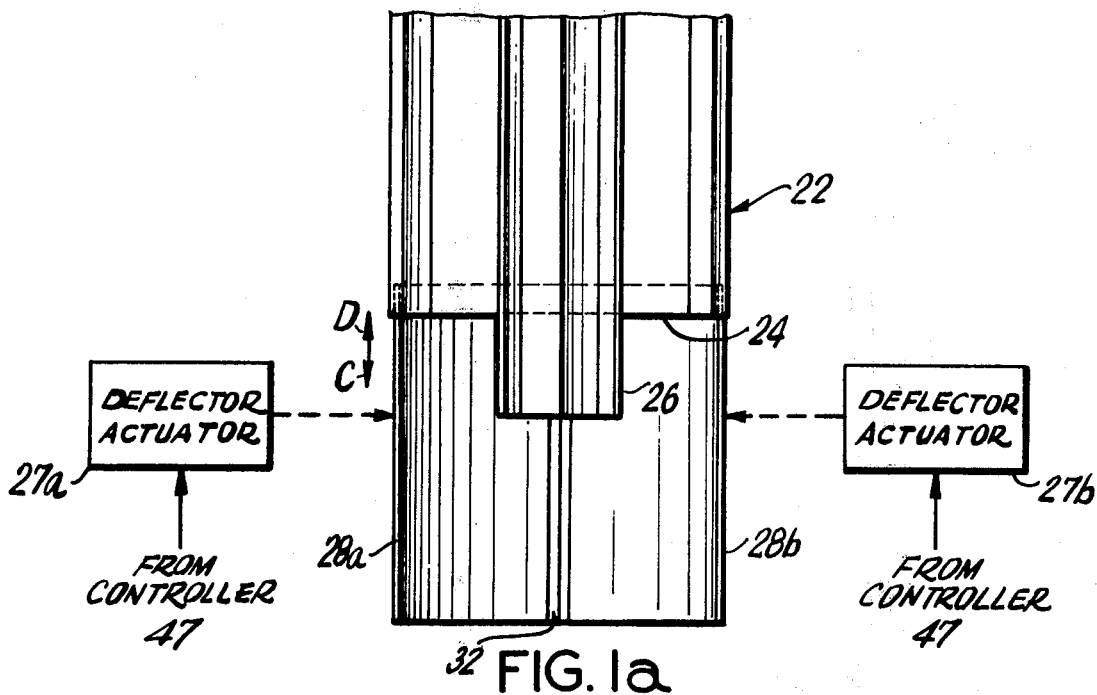
FIGS. 1a and 1b are schematic top and cross-sectional views illustrating automatic feeding apparatus constructed in accordance with the instant invention, shown in its "power off" position with the sequencer and controller shown in block diagram.

The drawings illustrate continuous automatic feeding apparatus, generally indicated at 20, which includes a per se conventional vibratory feeder trough 22 which axially reciprocates between directions C and D, but whose movement is faster in direction D so that the bulk material to be fed moves generally in direction C and is discharged out over front edge 24 thereof. Extending beyond edge 24 is a centrally disposed vibratory spoon 26 through which material will exit at a lesser rate than that of the material leaving the larger feeder edge 24. Accordingly, a high rate of flow of material exits from edge 24 of feeder 22 and a low flow rate from spoon 26. This differential in feed rates is due to the smaller discharge size of spoon 26.

Two deflector and hopper mechanisms employed in the instant apparatus are essentially mirror images of each other, and corresponding parts will be designated with like reference numerals bearing a subscript a or b. As the material to be fed is discharged over edge 24 and the front of the spoon 26 it will selectively contact deflector 28a or 28b, each of which is slideably axially displaceable and resides at any time in one of three distinct positions. Deflectors 28a, 28b are axially displaced by actuators 27a, 27b, e.g., per se conventional compressed air cyclinders, electrical or pneumatic motors or the like cooperating with follower arms driven thereby (not shown). However, any suitable means may be used to effect such displacement.

Figure 1B:
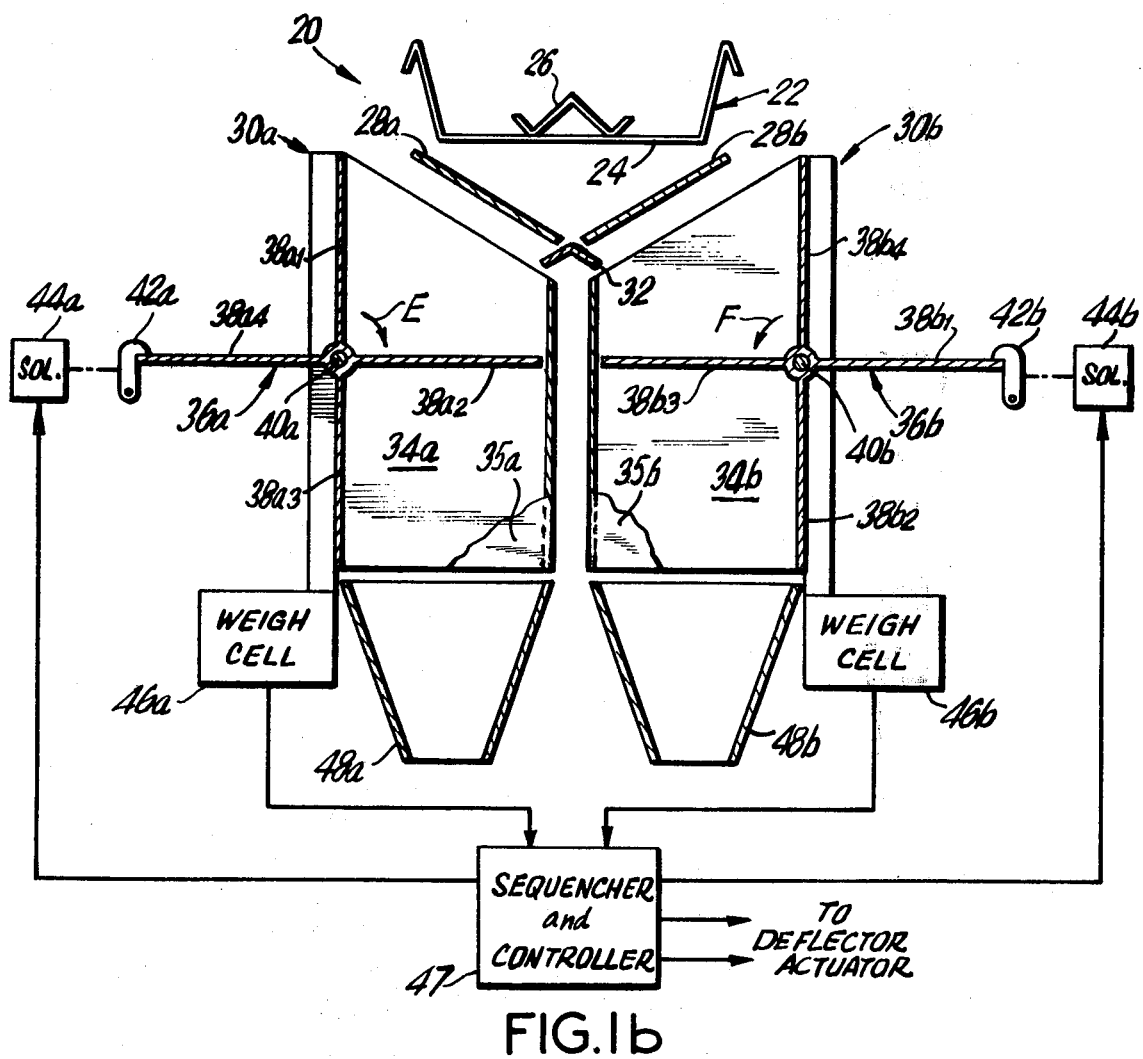

In their first (inactive) position, shown in FIGS. 1a and 1b, with the power to acuators 27a, 27b turned off, each deflector 28a, 28b will be in its fully extended position preventing any of the subject material from entering the hoppers 30a, 30b. Each deflector 28a, 28b is inclined so that in its fully extended closed position, it will deflect the material supplied thereto by the adjacent half of the feeder into the other hopper. A small fixed deflector 32 in the form of an inverted V prevents any of the fed material from falling between hoppers 30a, 30b.

Each deflector 28a, 28b has an second, intermediate position in which it will be so located as to be between discharge edge 24 of feeder 22 and the forward edge of spoon 26. Deflector 28a is shown in this second, intermediate position in FIG. 4a. In this position, the material exiting the approximate left half portion of feeder spoon 26 will be permitted to enter hopper 30a but the material exiting the left portion of edge 24 of the vibratory feeder 22 will be deflected by deflector 28a into hopper 30b. Thus, it is seen that in this second, intermediate position the respective hopper is fed at the lower feeding rate for corresponding operation of deflector 28b, see FIGS. 7a and 7b.

Figure 2A:
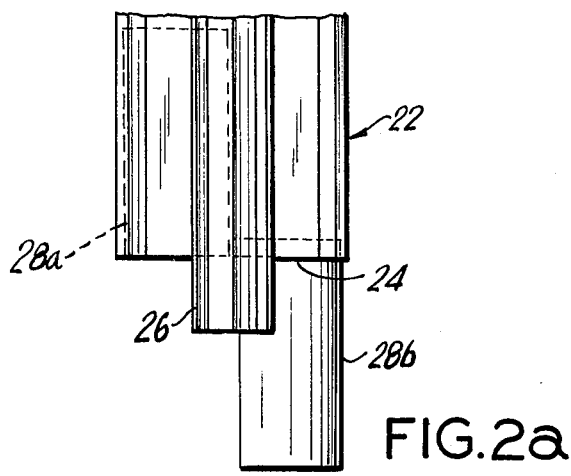
FIGS. 2a and 2b illustrate the automatic feeding device in its "power on" position.

Deflectors, 28a, 28b also have a third, fully retracted position, as seen for deflector 28a in FIG. 2a. In this position, material exiting the corresponding part of vibratory feeder 22, together with the material exiting the associated portion of spoon 26, will be allowed to fall into hopper 30a. Deflector 28b operates in like manner with respect to hopper 30b—see, for example FIGS. 5a and 5b.

Each hopper, 30a, 30b includes an enclosure including spaced parallel walls 34a–35a, and 34b–35b (see FIG. 1b), and a rotating wall unit 36a, 36b. Each rotating wall unit 36a, 36b comprises four walls 38a1–38a4, 38b1–38b4 radially extending from and rotationally mounted about pivots 40a, 40b. The then obtaining outermost walls 38a, 38b are engaged by pivots latch mechanisms 42a, 42b which are operated by solenoids 44a, 44b, respectively. Weigh cells 46a, 46b (per se well known) separately measure the weight of material loaded into each hopper unit 30a, 30b and may be preset at any desired weight. When the weight is met by the hopper contents, solenoids 44a or 44b as appropriate is activated to momentarily release the latch 42a or 42b which permits the rotary wall unit 36a or 36b to rotate 90° under the torque of the weight of the material therein. Upon such rotation, the material accumulated during the fill cycle is discharged into funnels 48a, 48b which lead to the packaging to be loaded (not shown). After the rotation of wall unit 36a or 36b, the latch 42a or 42b engages the next wall 38a or 38b and the filling process begins again.

The deflector actuator 27a, 27b; as well as weigh cells 46a, 46b and solenoids 44a, 44b are all interconnected by a sequencing and control unit 47 of any known type for effecting the operations described herein. Thus, for example the controller 47 may comprise a micropressor, ring-cascaded trigger circuits, or the like.

Figure 3A:
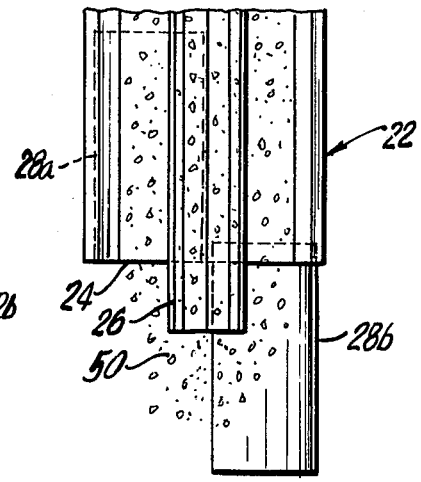
FIGS. 3a and 3b illustrate the device at the start of the feeding cycle of a first (left) hopper.
Figure 2B:
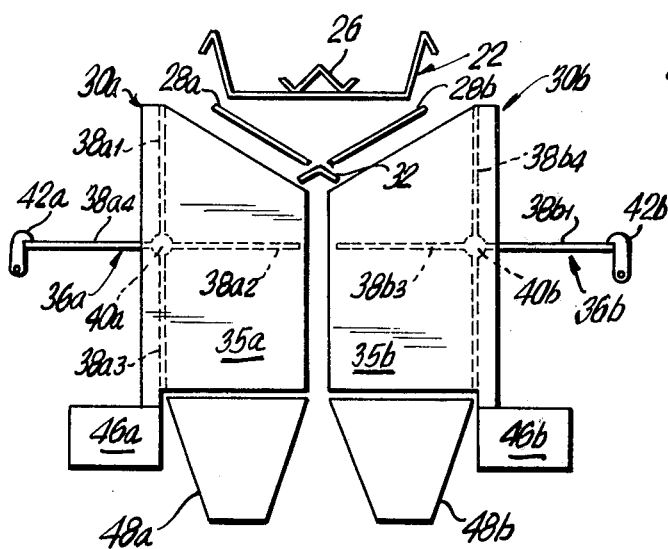
Figure 3B:
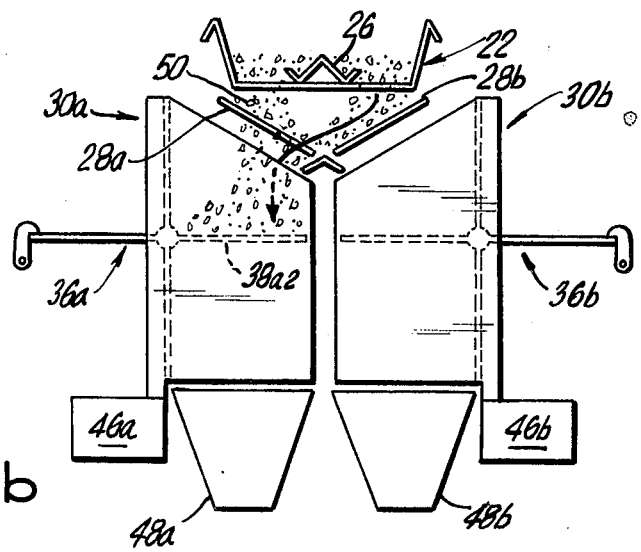

The continuous feeding cycle will now be explained in greater detail. FIGS. 1a and 1b illustrate the device in its inactive, or "power off" state with the deflectors 28a, 28b in their first, fully extended position. To begin the feeding cycle, the power is turned on and one deflector, e.g., the deflector 28a fully retracted into its third position as shown in FIGS. 2a and 2b. Deflector 28b remains fully extended in its first position. Vibratory feeder 22 will then be activated, as shown in FIGS. 3a, and 3b starting the bulk material 50 moving. Since deflector 28a is fully retracted, material exiting left portions of the vibratory feeder 22 and spoon 26 falls directly into hopper 30a. Furthermore, the material exiting the right side of vibratory feeder 22 and spoon 26 proximate to hopper 30b will be deflected by deflector 28b into hopper 30a by virtue of deflector 28b's fully extended position.

At a predetermined point near the completion of hopper 30a filling, e.g., when 90% of the target weight of material 50 has been registered on weigh cell 46a, the operating mechanism of deflector 28a is activated to displace the deflector to its second, intermediate point and deflector 28b is displaced into its third, fully retracted position as shown in FIGS. 4a and 4b. When this occurs, only the material exiting the left portion of spoon 26 is received in hopper 30a. All material exiting vibratory feeder 22 will be deflected by the partially extended deflector 28a cooperating with the retracted deflector 28b into hopper 30b. Thus, hopper 30a will be fed at a relatively low rate as it approaches its target weight (thus permitting firm and accurate weight discrimination), with the main bulk of the discharged material 50 beginning to fill hopper 30b.

When the target weight registered on weight cell 46a is reached, the control mechanism moves deflector 28a to its fully extended position shown in FIGS. 5a and 5b so that all material 50 exiting vibratory feeder 22 and spoon 26 is deflected into hopper 30b. Hopper 30a is then ready for discharge, as shown in FIGS. 6a and 6b, which will occur by activation of solenoid 44a permitting rotating wall unit 36a to rotate in direction E by virtue of the weight of the material 50 which is discharged into funnel 48a for delivery to any suitable packaging or recepticals. During the discharge of hopper 30a, (and, indeed, during the terminal part of filling hopper 30a), vibratory feeder 22 and spoon 26 continue to fill hopper 30b, since deflector 28a is fully extended and deflector 28b is fully retracted.

When the predetermined weight, e.g., 90% of the target weight on weigh cell 46b is reached, deflector 28b extends to its second, intermediate position shown in FIGS. 7a and 7b; and deflector 28a is withdrawnn to its third, fully opened position. When this occurs, hopper 30b will be fed only by the right portion of the spoon 26 discharge, and the bulk of material, exiting vibratory feeder 22, will be directed by deflector 28b into hopper 30a.

Figure 8A:
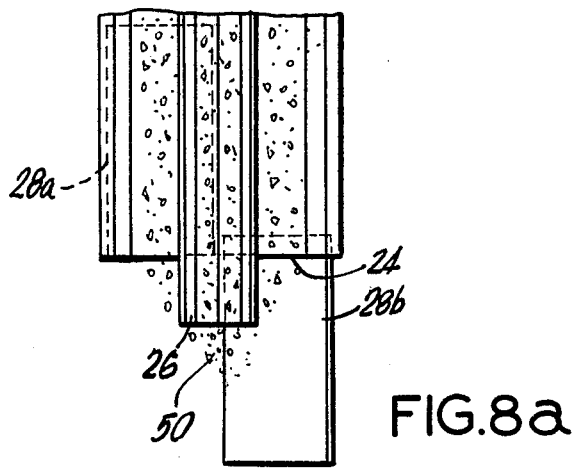
FIGS. 8a and 8b illustrate the device after the target weight of the second scale has been reached.
Figure 9A:
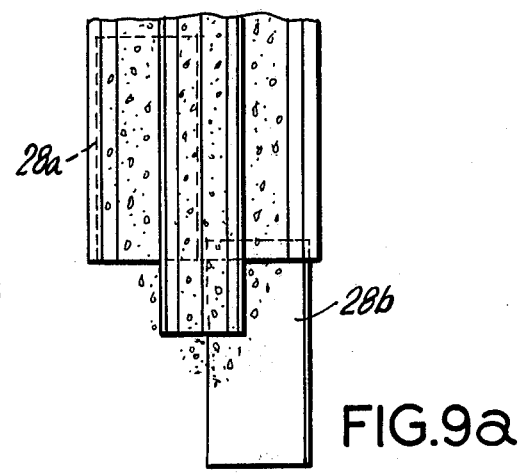
FIGS. 9a and 9b illustrate the discharge cycle of the second hopper and the next feeding cycle of the first (left) hopper.
Figure 8B:
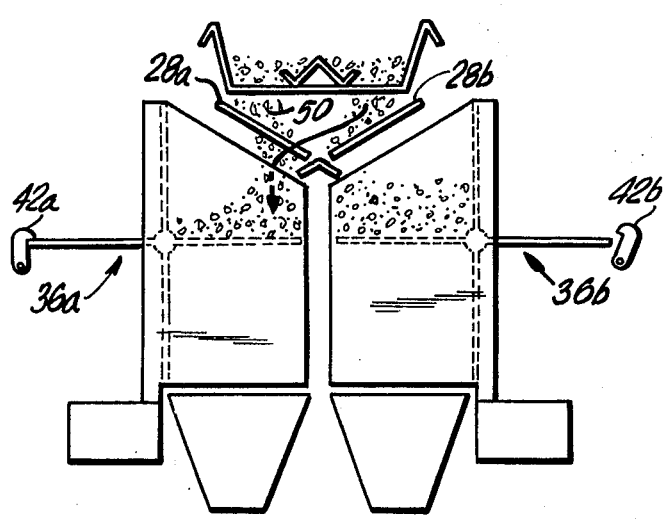
Figure 9B:
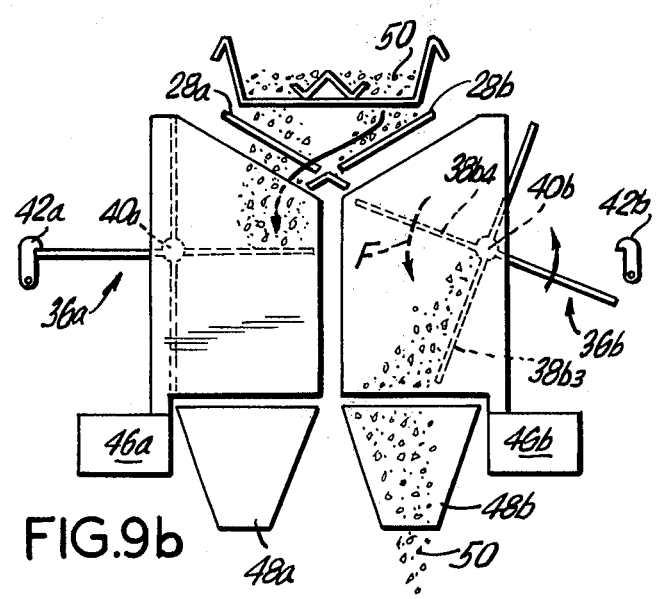

When the target weight registered on scale 46b is reached, deflector 28b is extended to its first, fully extended position, and deflector 28a remains in its fully retracted position, as shown in FIGS. 8a and 8b. This positioning will cause all of the discharged material 50 to be directed into hopper 30a with none entering hopper 30b. When this occurs, the discharge cycle of hopper 30b, as shown in FIGS. 9a and 9b, may begin. Solenoid 44b is activated to open latch 42b, releasing rotary wall unit 36b to permit it to rotate in direction F to discharge the materials into funnel 48b. The unit is thus returned to the mode shown in FIGS. 3a and 3b and the next feeding cycle of hoppers 30a, 30b will take place as set forth above.

The composite apparatus thus operates continuously, to alternately fill hoppers 30a and 30b without interruption.

Although the present invention has been described in conjunction with a preferred embodiment, it is to be understood that modifications and variations may be resorted to without departing from the spirit and scope of the invention, as those skilled in the art will readily understand.

What is claimed is:

1. Automatic continuous feeding apparatus for fluent material comprising;
    (a) first and second hopper means;
    (b) means for determining the weight of said first and second hopper means;
    (c) means for discharging said first and second hopper means when said hopper first and second hopper means reach a predetermined weight;
    (d) feeder means discharging said material into said hopper means, said feeder means coincidently discharging said material at first and second discharge rates;
    (e) first and second deflector means associated with said first and second hopper means, each of said deflector means having first, second and third positions, at said first position said deflector means preventing any discharge of said feeder means into said associated hopper, but deflecting said discharge into the other of said hoppers; at said second position said deflector permitting said material discharging at said first discharge rate to enter its associated hopper and deflecting said material flowing at said second discharge rate into the other of said hoppers; at said third position said deflectors permitting all of said material to be discharged into their associated hoppers; and
    (f) means for displacing said first and second deflector means into said first, second and third positions.

2. Apparatus as claimed in claim 1, wherein said first and second hopper means include at least one moveable wall being displaceable from a first position in which said material is held in place to a second position in which said material is displaced by gravity from said hopper.

3. Apparatus as claimed in claim 2, wherein said first and second hopper means further include at least two-fixed parallel walls, an axis normal to said to said parallel walls, said moveable wall being rotatably mounted about said axis.

4. Apparatus as claimed in claim 3, said first and second hopper means further including four radially extending moveable walls, each of said moveable walls being located at a 90° angle with respect to each other and latter means engaging one of said radially extending walls for holding said walls in place.

5. Apparatus as claimed in claim 1, wherein said feeder means comprise a vibratory feeder tray, said tray including a forward edge, said tray being reciprocated along its longitudinal axis to displace said material over said forward edge at said first discharge rate.

6. Apparatus as claimed in claim 5, wherein said vibratory feeder tray further includes a vibratory feeder spoon extending from said forward edge of said tray, said spoon discharging said material at a said second discharge rate.

7. Apparatus as claimed in claim 6, wherein said deflector means are displaceable parallel to the longitudinal axis of said tray, said deflector means having said first position extending beyond the said vibratory feeder spoon, said second position between said vibratory feeder spoon and said forward edge of said vibratory feeder and said third position within said forward edge of said vibratory feeder spoon.

8. Apparatus as claimed in claim 1, wherein said feeder means are located above said hopper means and said material flows into said hopper means by means of gravity, said deflector means being located between said feeder means and said hopper means, said deflector means being displaceable in and out of said flow of said material between said feeder means and said hopper means.

9. In combination material supplying means including feeder means having a discharge area and spoon means extending beyond said feeder discharge area, first and second adjacent hoppers each disposed beneath a portion of said feeder means and a portion of said spoon means, first and second deflectors means respectively disposed between said first and second hoppers and said material supplying means for selectively deflecting material supplied by said material supplying means to the other of said hoppers and means for selectively disposing each said deflector means in a first position and a third position for full communication and full isolation between said material supplying means and said hopper associated with said deflector means, and a second, intermediate position permitting communication between said spoon means and said associated hopper.

* * * * *